(12) United States Patent
Rupaner et al.

(10) Patent No.: US 6,428,199 B1
(45) Date of Patent: Aug. 6, 2002

(54) CHEMICAL REACTOR WITH STIRRER AND INCOMING AND OUTGOING LINES ON THE REACTOR FLOOR

(75) Inventors: Robert Rupaner, Ellerstadt; Sven Lawrenz, Mannheim; Gerhard Bauer, Weinheim, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/037,798

(22) Filed: Mar. 10, 1998

(30) Foreign Application Priority Data

Mar. 17, 1997 (DE) .......................................... 197 11 020

(51) Int. Cl.⁷ .............................. B01F 7/16; B01F 15/02
(52) U.S. Cl. ...................... 366/172.1; 366/314; 422/225
(58) Field of Search ........................ 366/64–66, 96–98, 366/102–104, 262–266, 314, 172.1; 422/135, 225, 226, 229, 227, 228; 99/277.2

(56) References Cited

U.S. PATENT DOCUMENTS

| | | | | |
|---|---|---|---|---|
| 634,093 A | * | 10/1899 | Rosenblum et al. | |
| 672,454 A | * | 4/1901 | Nelson | |
| 1,183,885 A | * | 5/1916 | Landis | |
| 1,307,588 A | * | 6/1919 | Lane | |
| 2,607,674 A | * | 8/1952 | Winter, Jr. | |
| 2,628,081 A | * | 2/1953 | Laird | |
| 2,884,234 A | * | 4/1959 | Gebhart et al. | |
| 3,003,986 A | * | 10/1961 | Long | |
| 3,206,287 A | * | 9/1965 | Crawford | |
| 3,749,555 A | * | 7/1973 | Beckmann et al. | |
| 3,987,021 A | * | 10/1976 | Rothert | |
| 4,007,016 A | * | 2/1977 | Weber | |
| 4,125,574 A | * | 11/1978 | Kastner et al. | 422/135 |
| 4,134,736 A | * | 1/1979 | Hammond, Jr. | 422/135 |
| 4,224,108 A | * | 9/1980 | Takahashi et al. | |
| 4,243,633 A | * | 1/1981 | Hozuma et al. | |
| 5,018,870 A | * | 5/1991 | Brazelton et al. | |
| 5,284,627 A | * | 2/1994 | Brazelton et al. | |
| 5,334,359 A | * | 8/1994 | Masutomi et al. | |
| 5,456,586 A | * | 10/1995 | Carson | |

* cited by examiner

Primary Examiner—Charles E. Cooley
(74) Attorney, Agent, or Firm—Keil & Weinkauf

(57) ABSTRACT

A reactor for chemical reactions, especially polymerization reactions, and in particular a reactor for emulsion, suspension, solution, bulk and/or precipitation polymerizations, which has a stirring mechanism, incoming and outgoing lines and a removable lid, and where both the stirring mechanism and incoming and outgoing lines are installed on the reactor floor. The novel reactor is quick and easy to open and clean and permits simple and rapid changeover of the installed stirring elements.

7 Claims, 1 Drawing Sheet

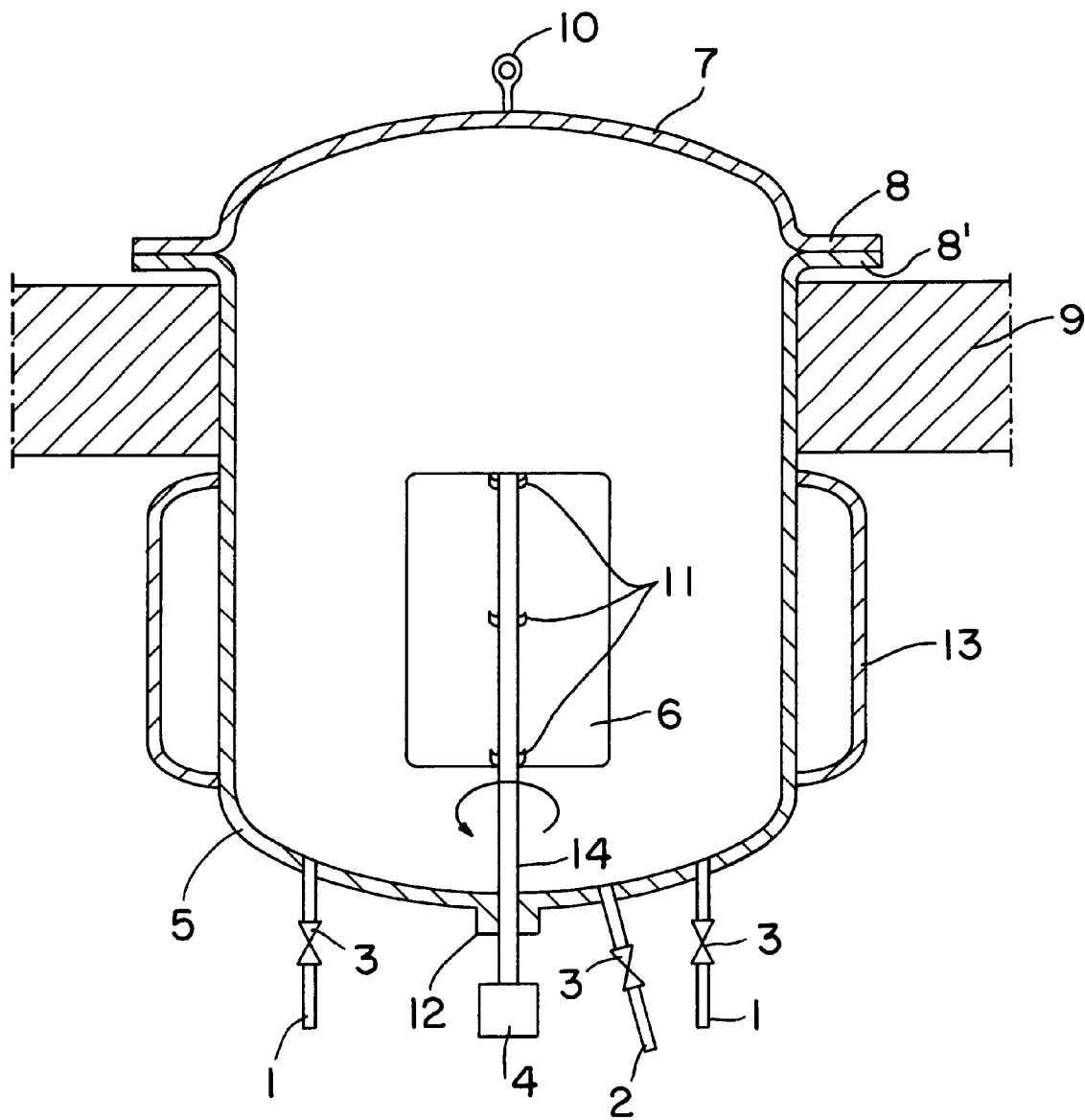

CHEMICAL REACTOR WITH STIRRER AND INCOMING AND OUTGOING LINES ON THE REACTOR FLOOR

BACKGROUND OF THE INVENTION

The invention relates to a reactor for chemical reactions, especially to a polymerization reactor and in particular to a reactor for emulsion, suspension, solution and/or bulk polymerization.

The preparation of polymers by liquid phase polymerization is customarily subdivided into bulk, solution, precipitation, suspension and emulsion polymerization, the latter two techniques differing from the others in starting from an already two-phase initial mixture. The polymerization reaction is conducted either in a batch reactor, in a continuous flow pipe, in a cascade of stirred vessels or in a continuous stirred-vessel reactor. Among these, vessel reactors have acquired the greatest importance in the chemical industry since they possess great flexibility in terms of operating conditions and mode of operation and can be adapted to virtually all process requirements. Stirred-vessel reactors are suitable for discontinuous and continuous operation and possess a broad scope of application ranging from laboratory vessel to large-scale reactor. Stirred-vessel reactors are available in standardized constructions in a very wide variety of materials and combinations of materials for numerous applications.

In addition to the customary cooling and heating devices and incoming and outgoing lines for starting materials and products, the reactor vessels have stirring devices, usually consisting of a stirrer driven by way of a stirrer shaft, and for certain applications also have stators which act as flow disruptors for better mixing. The stirrers themselves are fastened to usually vertical stirrer shafts which project either from above or from below into the generally cylindrical reactor vessel. Central installation from above into the reactor vessel is generally preferred in accordance with the prior art, since it is then relatively easy to seal off the stirrer shaft. A disadvantage is that, because of the bending moments which occur, the stirrer shaft must have a relatively large diameter. Introducing the stirrer from below into the reactor, on the other hand, reduces the stirrer mass but requires more complex sealing of the stirrer shaft at its point of penetration through the reactor floor.

It is known to achieve many different tasks in process engineering with the aid of stirring devices. Examples of such tasks include dispersing, homogenizing, mixing, gassing, heat transfer, suspending and dissolving. Depending on parameters specific to the system, such as viscosity, number of phases, density and differences in density, particle sizes, shearing, heat production and reaction temperature, there are complex theoretical relationships of heat transfer and fluid dynamics, and a large number of specially constructed stirrer forms and reactor forms which have already been proposed is intended to address these relationships. To enable the processes to be conducted more safely, specific techniques have also been employed, such as semicontinuous supply of the substance streams, whose intention is to provide better control of the liberation of heat. The literature includes a large number of recommendations which provide for each problem that occurs an appropriate solution in the form of particular designs of apparatus (for example, stirrer type), specification of parameters (for example, rotary speed or dimensioning) or formulations and particular measures (for example, use of solvents for controlling viscosity and as heat transfer medium, control of polymerization temperature and/or of the addition of the substance streams). Regarding further studies in the technical aspect of stirring in reactors, the accompanying phenomena of heat transfer and the knowledge of flow processes, reference is made to the literature cited at the end of the description.

In [11] (see the list at the end of the description) the introduction (pp.282–285) gives some examples of industrial reactors and the problems which occur in the course of their operation.

[17] investigates the effect of some technological parameters on the course of the emulsion polymerization of the styrene-butyl acrylate-acrylic acid system. It was found that the addition of the monomer emulsion by way of a pipe through the lid of the reactor into the space between the bottom blade of the stirrer and the floor of the reactor prevents the formation of coagulum. On the other hand, however, an increase in the amount of residual monomer, and a greater variation in particle size, implying poorer reproducibility, were observed.

Once a reactor has been installed it is frequently used to prepare a large number of different products. This means that the system is generally optimum only for the design case and must be modified if a different product is to be prepared. Among the known polymerization reactors and stirring devices it is true that there are already embodiments which permit conversion to a different polymerization process, for example by replacing the stirring blades, with relatively little difficulty. However, there continues to be a lack of constructions which enable the conversion and cleaning of the polymerization reactor to be carried out much more simply, more rapidly and thus more cost-effectively when changing over to a different production process.

It is also already known to instal stirrers from below into the reactor (see DE 44 21 949, column 3, lines 7–18 [13]). FIG. 1 of DE 44 21 949 also reveals a discharge port on the floor of the reaction vessel. The feed flows are introduced into the reactor from above. A reactor of this kind is relatively difficult to clean.

It is an object of the present invention, therefore, to provide a reactor for chemical reactions which permits approximation to the process optimum for the particular process, e.g. polymerization process, being conducted without great expenditure in terms of time and money. Such a reactor should, moreover, feature high flexibility in respect of switching the plant over to other processes.

SUMMARY OF THE INVENTION

We have found that this object is achieved, surprisingly, by a reactor where the stirring mechanism and the incoming and outgoing lines are installed on the reactor floor.

The term stirring mechanism refers here to a stirring device comprising one or more than one stirrer.

The invention accordingly relates to a reactor for chemical reactions, in particular to a polymerization reactor, having a stirring mechanism, incoming and outgoing lines and removable lid, wherein both the stirring mechanism and incoming and outgoing lines are installed on the reactor floor.

The terms incoming and outgoing lines refer both to lines for streams of substances such as starting materials or products and to electrical and other lines for, say, temperature sensors, pH measuring equipment, pressure measuring equipment, concentration determining probes, instruments for optical analysis, or other on-line analytical instruments.

The advantages achieved with the novel reactor are many and various:

After removal of the lid, the interior of the reactor is readily accessible. This facilitates a cleaning operation and enables stirring blade changeover to be carried out easily and quickly. The cleaning of stirring blade, stirrer shaft, internals and especially the inner wall, floor and lid of the reactor to remove wall deposits and baked crusts, which depending on the composition of the polymer can be very hard or very soft or visco elastic, and can be several centimeters thick, is very easy if the lid can be taken off and removed to the side. This is particularly important in the case of the emulsion polymerization of shear-sensitive products, since in this case there are particularly thick deposits in high-shear regions, for example on the stirrer or internals, which greatly reduce the passage of heat and which impair the function of the sensors (for example, temperature control).

The possibility afforded by the invention for rapid and simple changeover of the stirring mechanism is a significant advantage, since the different products, formulations or mixtures prepared and processed in a polymerization reactor differ in viscosity, sensitivity to shearing, soiling tendency and color. Another example is the preparation of polymer dispersions which, for example, have particular adhesive groups whose purpose when applied, for example, to metal is to produce effective adhesion to substrates. Products of this kind naturally adhere very well to the reactor wall too, leading to an increased need for cleaning.

Customary stirrers are single-stage or multistage embodiments, especially those which produce not only a tangential flow component but also an axial flow field. Preferred stirrers are those having 1 to 7 stirring blade stages attached, preferably equidistantly, on the axial stirrer shaft, examples being blade, anchor, impeller, Pfaudler, disk, helical, bar, finger, propeller, sigma, paddle, pitched-blade and coaxial stirrers and also corresponding multistage stirrers, such as cross-arm, multiflow, multipulse countercurrent (Mehrimpulsgegenstrom, MIC), INTERMIG and INTERPROP stirrers (cf. [4]). With the multistage stirrers it is possible, by altering the distance between the stirrer stages and/or their relative angles, to exert appropriate influence on the requirements of fluid dynamics and on the problems of heat dissipation of the particular reaction. The literature recommends various stirrers for different viscosities, flow conditions and heat release. An overview of stirrer types can be found, for example, in [4] on page RS2,3 and [7] on page 92 ff. Double blade stirrers with various constructional examples are described in [14] and [15].

BRIEF DESCRIPTION OF THE DRAWING

The FIGURE depicts the inventive reactor.

In accordance with preferred embodiments, the novel reactor for chemical reactions comprises stirrer combinations such as coaxial, MIG or double blade stirrers or else anchor/blade combinations, or very close-clearance stirrers such as helical or anchor stirrers.

The stirring blades are fastened to the central stirrer shaft preferably means of screw connections. After these screw connections have been undone, the stirring blades can be removed upward from the reactor in a simple manner—for example, with the aid of a traction device—and replaced by different blades.

Smooth stirring blades with rounded edges and angles should be used when a reduction in the shear effect is desired.

For stirring small amounts of substance, it is particularly important for the stirrer to pass close to the floor. In the case of helical and coaxial stirrers, the shape of the stirrer can be adapted to the curvature of the reactor. In the case of multistage stirrers it is possible to use a small stirring blade adapted to the curves of the reactor wall in the outer region, if desired. In this way even the last fraction of the product, when it is drained off, is still adequately stirred and mixed (forced traversal of a shear zone).

Special arrangements, too, for example a plurality of stirrers in the vessel, are appropriate in accordance with the invention. In this case it is also possible to deviate from the centrosymmetric installation of the stirring mechanism. This arrangement is advantageous in terms of the turbulence of the fluid system which can be generated. If flow disruptors are to be used, they can be installed on the reactor wall or on the lid. In the case of lid mounting there is the advantage of easy removability.

For installing a stirrer from below into the reactor, a submerged construction of the stirring mechanism is necessary. For this purpose it is found advantageous to use a double-acting submerged face seal, especially of type LRD 44, which is mentioned in literature reference [10] for polymerization reactors and is also described in [4] on page DS 6. The face seal can be lubricated, or sealed off, with product or with a component which is present in the reaction vessel, thereby ensuring that no extraneous lubricant passes into the end product.

The construction and design of the stirring motor and gearing are known to the skilled worker (see [4]). A motor is used whose power is sufficient so that even materials of relatively high viscosity can be stirred. The rotational speed of the stirrer is adjustable and can be set, for example, in the range 0–200 rpm (revolutions per minute).

Because of the installation of the stirring mechanism and the connection of the incoming and outgoing lines in the reactor floor, the space below the lid remains free from structural components which could become soiled, sticky or damaged. Because of this, the novel polymerization reactor can be filled almost completely.

Foam which appears is easily suppressed. Even with the reactor not completely filled, the foaming propensity is found to be low compared with that of conventional reaction vessels. The reason for this is that there is no penetration of a fluid surface by metal parts such as stirring blades or stirrer shafts, so that gas intake is minimized.

If emulsion polymerizations are conducted in the novel polymerization reactor, the inflow of the monomers in pure or emulsified form from below through the reactor floor is advantageous for three reasons: firstly, the difference in density between the aqueous phase and the majority of monomers means that, in the course of phase separation, the oil phase rises and thus passes through the reaction medium and, in particular, the shear zone; secondly, the inflowing monomer emulsion does not fall onto the stirring blades and is therefore not, as a result of the centrifugal forces which occur, thrown toward the reactor wall where it can lead to the formation of deposits; and thirdly, the effect of the gentle inflow into the reaction mixture brings about rapid mixing, because of the rapid equalization of concentration and temperature, and causes little foaming. These advantages also result when the stirrer construction is introduced through the reactor lid in conventional manner.

A typical reactor for chemical reactions in industry is a stainless steel pressure vessel (autoclave) of corresponding wall thickness which in general withstands a pressure of at least 6 bar. Preference is given to reactors designed for 25 bar. The inner wall and all internals, thus including the stirrer, are preferably polished smooth, electropolished or enameled. Particular preference is given to stainless steel configurations with an electropolished surface. The term internals includes flow interrupters or other kinds of flow disrupters, guide vanes, thermocouples, recesses for sensors, and heating or cooling devices.

Typically, the novel reactor has a cylindrical shape with a dished torospherical or basket end. The ratio of the height of the convexity to the diameter of the lid is in this case from 1:1 to 10:1 and, preferably, from 1.2:1 to 6:1. With particular preference this ratio is in the range from 1.4:1 to 3:1. The floor can also be planar in form. The volume of the reactor is not critical, and can be from 0.8 $m^3$ to 200 $m^3$. A size of from 1 to 50 $m^3$ is preferred.

A sampling device can also be installed on the floor of the reactor. If the reactor is to be connected to other reaction vessels or downstream conditioning vessels, it may be necessary to attach a plurality of outgoing lines. Generally, each outgoing line contains a filtration screen.

In its simplest constructional form the reactor lid is flanged onto the reactor vessel by means of a simple connecting flange. There are sealing fittings between the lid and body of the reactor. The lid is fastened with sufficient quantities, depending on the pressure range, of screw connections. Suitable seals are, for example, simple flat seals, O-rings, multiple lip seals, delta or compact seals, made from materials which withstand the particular reaction mixture. Such materials are sufficiently known to the skilled worker. Selected examples are seals of elastomers (acrylonitrile-butadiene, silicone, SB or chlorobutadiene), polyethylene, Teflon, rubber or soft metal. There is a review of sealing methods, sealing materials and closure constructions in references [8] and [9]. For simple sealing, ie. the compression of the seal, the reaction vessel is evacuated, in other words rendered inert for the subsequent reaction, and during this procedure the lid is tightened further. Depending on the reaction to be conducted the reactor can be filled with new gas mixture (air, nitrogen, reaction gas, carbon dioxide and so on). It can also be operated in evacuated form.

In addition to simple flange connections, more complex closure techniques are also suitable, which are advantageous in terms of safety and operation and in particular in terms of the amount of time involved in opening and reclosure. Such techniques include quick-release closures whose closure mechanism engages by way of a rotational movement. Forms of seals suitable for this purpose are, for example, O-ring seals. A further embodiment employs a bayonet closure, in which the lid can be detached from the reactor body by means of a rotational lifting movement. In this case use is preferably made of seals installed below the reactor flange, which owing to the embracing flange of the lid provide stronger and stronger sealing as the internal pressure of the reactor is increased. Also suitable are snap closures; that is, embracing holders which through resilience or the like press against, leading, perpendicular thereto, to compression of the seal. A simple sealing flange, however, is preferred.

To regulate and set the temperature it is possible to use a variety of systems. Heating and/or cooling coils let into the reaction chamber (heat exchangers within the reactor), although offering a high level of heat transfer, are generally difficult to clean, can give rise to very great shearing and thus formation of coagulum, have regions where mixing does not occur, also known as deadwater zones, and restrict the dimensioning of the stirrer in the interior of the reactor. Preference is therefore given to external cooling jackets with which the reactor can be heated or cooled, alternately if desired. The system involved can be either a true jacketed reactor design or else pouches or pipes which are welded onto the reactor casing and traversed by the coolant.

One embodiment of the reactor described contains a further connection for an evaporative cooler in the lid. Such a cooler is able, depending on the design size, to conduct an effective amount of reaction heat out of the system by condensing the boiling mixture in the interior. The return flow from the cooler can flow back directly into the reactor, or fresh reaction materials to be fed into the reactor can be supplied by way of a forced feed.

Transferring out some of the reaction medium and cooling it by way of a heat exchanger is also an effective method of cooling (cf. [12]).

The novel reactor is used preferably for polymerizations, especially for liquid phase polymerization reactions, such as bulk, solution, precipitation, suspension or emulsion polymerization, including mini, micro and inverse emulsion polymerization. The term polymerization reactions as used herein includes not only addition polymerization but also polycondensation and polyaddition reactions. These are preferably exothermic reactions which are carried out isothermally, meaning that the heat of reaction has to be dissipated. Moreover, such reactions are conducted at particular, defined temperatures which also determine the properties; in other words, the reaction medium must generally be heated to the reaction temperature before the beginning of the reaction. With an appropriate choice of stirring blade, the vessel can also be used for other purposes which require intensive mixing, for example to prepare solutions, emulsions, processing of product dispersions and suspensions, for workup and for mixing liquid components or products.

The novel reactor is preferably used for emulsion polymerization reactions. Preference is given to the preparation of single-stage or multistage polymers based on homopolymers or copolymers from various classes of compound, of which the following are some examples:

Ethylenically unsaturated monomers, especially $C_2$–$C_{20}$ α-olefins, such as ethylene and propylene, vinylaromatic compounds, such as styrene, α-methylstyrene or vinyltoluenes, $C_1$–$C_{12}$-alkyl vinyl ethers, such as methyl or ethyl vinyl ether, vinyl esters of $C_1$–$C_{18}$ monocarboxylic acids, such as vinyl acetate or vinyl propionate, esters of α,β-ethylenically unsaturated mono- or dicarboxylic acids, such as acrylic, methacrylic or maleic acid, with $C_1$–$C_{12}$ alkanols, such as methanol, ethanol, n-propanol, isopropanol, 1-butanol, 2-butanol, isobutanol, tert-butanol and 2-ethylhexanol, acrylonitrile, methacrylonitrile, vinyl chloride, vinylidene chloride, butadiene, isoprene, α,β-ethylenically unsaturated $C_3$–$C_6$ mono- and dicarboxylic acids, such as acrylic acid and methacrylic acid, and their amides, such as acrylamide and methacrylamide, and N-methylol compounds thereof.

It is possible advantageously to prepare styrene-butadiene dispersions, styrene-acrylate dispersions or acrylate dispersions, especially those with a broad particle size distribution and/or with a viscosity of from 30 to 500 mPas.

Preferred polymers are

Homo- or copolymers of acrylic and methacrylic esters, especially of methyl, ethyl, butyl, ethylhexyl acrylates, hydroxyethyl and hydroxypropyl acrylates and methacrylates homo- or copolymers of styrene with butadiene and/or (meth)acrylonitrile and/or with the abovementioned (meth)acrylic esters homo- or copolymers of vinyl acetate and/or vinyl propionate with ethylene, butadiene or the abovementioned (meth)acrylic esters homo- or copolymers of vinyl chloride and/or vinylidene chloride with the abovementioned (meth)acrylic esters, olefins or vinylaromatic compounds homo- or copolymers of acrylic, methacrylic or maleic acid with other acids or acid anhydrides, such as maleic acid (anhydride), (meth)acrylamide and/or olefins.

The polymerization temperature is usually from 30 to 140° C. To initiate the emulsion polymerization the customary water-soluble free-radical initiators are employed in an amount of preferably from 0.05 to 3% by weight, based on the monomer phase. Examples of free-radical initiators are peroxides, such as ammonium peroxodisulfate, potassium peroxodisulfate, hydrogen peroxide, mono- or diacyl peroxides, alkyl hydroperoxides, and azo compounds. Initiation can be carried out directly by raising the temperature or through the use of reducing agents (redox systems).

As dispersants it is possible to employ the protective colloids or ionic and nonionic emulsifiers which are customary in connection with emulsion polymerization. It is preferred to employ from 0.1 to 5.0% by weight of emulsifier, based on the monomer phase. It is also possible if desired to employ buffer substances, such as sodium carbonate, sodium hydrogen phosphate or alkali metal acetates, polymerization regulators, such as mercaptans, or crosslinking monomers, such as bisacrylates or N-methylol (meth)acrylamides, for the polymerization.

The polymerization can be conducted continuously or discontinuously, with or without the use of seed latices, and with all or some constituents of the reaction mixture being included in the initial charge or else part of all or some of the constituents of the reaction mixture being included in the initial charge and some being fed in, or in accordance with a feed technique without an initial charge.

Chemical aftertreatment or workup or treatment of a polymer dispersion with steam, carbon dioxide or other gaseous components may follow in a customary manner.

The FIGURE shows a novel polymerization reactor suspended in a floor opening in a plant. It has a curved floor 5 fitted with two incoming lines 1 and one outgoing line 2. Product feed and discharge takes place by way of valves 3. Installed in the floor is a blade stirrer 6 provided with a drive motor 4. The stirring blades are connected by way of mounting devices 11 to the shaft 14 of the stirrer. The cylindrical reactor is closed with a domed lid 7 which has a holder 10 for removing the lid. As seen in the FIGURE, the lid 7 is not provided with any stirring mechanism or incoming or outgoing lines. The lid is provided with a circumferential flange 8 which bears on the corresponding circumferential flange 8' of the cylindrical part of the reactor. Sealing is by means of a seal installed between the flanges 8 and 8'.

EXAMPLES

Emulsifier 1: 20% strength by weight solution of a p-octylphenol ethoxylate with 25 mol of ethylene oxide Emulsifier 2: 35% strength by weight solution of a sodium salt of sulfated p-nonylphenol ethoxylate with 25 mol of ethylene oxide Example 1

The experiment is conducted in an 18 m³ reactor in accordance with the FIGURE with h/D=2.1 (height/diameter ratio), provided with a 4-stage MIG stirrer (d/D=0.85; ratio of stirrer diameter/reactor diameter) with stirring blade stages offset relative to one another by 90°, and at 43 rpm. An initial charge consisting of 2200 kg of water and 10 kg of ascorbic acid is heated to 80° C. On reaching an internal temperature of 70° C., 200 kg of sodium persulfate solution (2.5% strength by weight) are fed in through one incoming line 1. Addition is then begun of the monomer emulsion ME1, added continuously over 210 minutes, and of 1740 kg of sodium persulfate solution, added over 240 minutes, by means of separate incoming lines 1, the internal temperature being allowed to rise to 85° C. During the addition, jacket cooling is deployed to the cooling limit. After complete addition, the mixture is held at 85° C. for 2 h, cooled, neutralized with ammonia solution and filtered through a 250 μm filter. A coagulum-free dispersion is obtained having a solids content of 55.3%, a pH of 7.5, an LT of 49%, a viscosity of 78 mPas and a content of fine coagulum of 0.001%. The particle size distribution is tetramodal. There are no deposits on the wall. Compostion of ME1:

| | |
|---|---|
| 1900 kg | of water |
| 970 kg | of emulsifier 1 |
| 700 kg | of emulsifier 2 |
| 194 kg | of acrylic acid |
| 1160 kg | of acrylonitrile |
| 8315 kg | of butyl acrylate |

Example 2

Example 1 is repeated in the same reactor with the difference that a feed stream consisting of acrylonitrile and butyl acrylate and a second, aqueous feed stream consisting of water, acrylic acid, emulsifiers and sodium persulfate (proportions as in Example 1) are fed into the reactor from below. The two streams are mixed shortly before entering the reactor. In this case the stirrer speed is raised to 45 rpm and the feed time to 180 minutes. The aqueous feed is run in more slowly by 15 minutes. After complete addition, the mixture is held at polymerization temperature for 2 hours more, cooled and filtered to remove the coagulum formed. A dispersion is obtained having a solids content of 55.3% and a pH of 7.8. The particle size distribution and viscosity are not significantly different from Example 1.

Example 3

In the reactor from Example 1 a mixture of 1980 kg of water and 11 kg of ascorbic acid is heated to 82° C. at 43 rpm. On reaching an internal temperature of 70° C., 230 kg of sodium persulfate solution (2.5% strength by weight) are fed in from below. Addition is then begun of the monomer emulsion ME3, added continuously over 5.5 h, and of 730 kg of sodium persulfate solution (7% strength by weight), added over 6 h, from below. During the feeds, jacket cooling is deployed to the cooling limit. After complete addition, the mixture is held at polymerization temperature for 2.5 h and filtered through a 250 μm filter. Following the removal by filtration of about 3 kg of coagulum, a dispersion is obtained having a solids content of 64.9%, a pH of 4.5, an LT of 34%, a viscosity of 227 mPas and a content of fine coagulum of 0.003%. The reactor wall is free from deposits. The particle size distribution is trimodal. Compostion of ME3:

| | |
|---|---|
| 1915 kg | of water |
| 750 kg | of emulsifier 2 |

| | |
|---|---|
| 227 kg | of acrylic acid |
| 794 kg | of vinyl acetate |
| 9956 kg | of butyl acrylate |

Example 4

Example 3 is repeated with the modification that the dispersion obtained is afterpolymerized for 2.5 h after the feed streams have been completely fed in and, during this afterpolymerization, 270 kg of 10% strength by weight tert-butyl hydroperoxide solution and, after 5 minutes, a solution of 170 kg of 10% strength by weight sodium hydroxymethanesulfinate (Rongalit C) are fed in from below over 1 h. Thereafter, the total proportion of residual monomer is below 500 ppm. The particle size distribution is trimodal.

Prior art:

[1] Ullmanns, Encyclopedia of Industrial Chemistry, 5th edition, Volume B2, Chapter 25

[2] Ullmann, 5th edition, Vol. B4., p. 121 ff. and p. 167 ff. (Overview of reactors used in industry)

[3] Ullmann, 5th edition, Vol. A21, p. 389, right-hand side

[4] Brochure from EKATO; Handbuch der Rührtechnik, (1990)

[5] Chem. Ing. Techn. 51 (1979) pp. 430–436 (Stirring of media of low and medium viscosity)

[6] Chem. Ing. Techn. 47 (1975), pp. 953–996 (Design and scaleup of stirring apparatus)

[7] H. P. Wilke et al. "Rührtechnik", Hüthig-Verlag, Heidelberg, (1991)

[8] E. Schmidt et al., Handbuch der Dichtungstechnik, Expert-Verlag, Grafenau/Württemberg (1981)

[9] Dubbel, Taschenbuch für den Maschinenbau, W. Beitz and K. H. Küttner, Springer-Verlag, Berlin, 17th edition, Section 2.10, pp. K17–K19

[10] A. Kläβ et al., Rührwerks-Gleitringdichtungen für den Einsatz in der chemischen Industrie, in "Handbuch Dichtungen" Faragallah-Verlag, Sulzbach/Ts. (1990), pp. 654–664

[11] Verfahrenstechnische Berechnungsmethoden, Part 5: Chemische Reaktoren; VCH Weinheim (1987), Chap. 15, Polymerization reactors

[12] US 2 989 517

[13] DE 44 21 949

[14] JP 07 292 002

[15] WO 9 322 350

[16] Adolf Echte, Handbuch der technischen Polymerchemie, Verlag Chemie, Weinheim (1993), pp. 464–465

[17] A. Matejicek et al., Chem. Prum. 37(3) (1987) 144–147 (C.A. 106:176 933)

We claim:

1. A polymerization process comprising the steps of adding reactants which include polymerizable monomers to the interior of a reactor which comprises a reactor floor and a removable lid, said reactants being added via incoming lines arranged in said reactor floor, stirring said reactants with a stirring mechanism which is installed only in said reactor floor, removing polymerized products and residual reactants via an outgoing line which is installed in the reactor floor.

2. The process of claim 1, further comprising an emulsion, suspension, solution, bulk or precipitation polymerization reaction of the monomer in the reactor.

3. The process of claim 2, wherein the polymerization reaction is an emulsion polymerization reaction.

4. The process of claim 1, wherein the lid is not provided with any stirring mechanism or incoming or outgoing lines.

5. The process of claim 1, wherein said reactants are stirred with a coaxial, MIG, double-blade or anchor/blade stirrer combination installed in said reactor floor.

6. The process of claim 1, wherein said reactants are stirred with a helical stirrer or an anchor stirrer installed in said reactor floor.

7. The process of claim 1, wherein said reactants are stirred with a blade, turbine or propeller stirrer installed in said reactor floor.

* * * * *